(12) United States Patent
Sandahl et al.

(10) Patent No.: US 12,122,000 B2
(45) Date of Patent: Oct. 22, 2024

(54) WIRELESS WELDING-TYPE POWER SUPPLY MANAGEMENT

(71) Applicant: Illinois Tool Works Inc., Glenview, IL (US)

(72) Inventors: Daniel J. Sandahl, Appleton, WI (US); Anthony J. Kowaleski, Manawa, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 548 days.

(21) Appl. No.: 16/868,138

(22) Filed: May 6, 2020

(65) Prior Publication Data

US 2021/0346973 A1 Nov. 11, 2021

(51) Int. Cl.
| | |
|---|---|
| B23K 9/10 | (2006.01) |
| B23K 9/095 | (2006.01) |
| G08C 17/02 | (2006.01) |
| H04W 4/80 | (2018.01) |

(52) U.S. Cl.
CPC .......... *B23K 9/1062* (2013.01); *B23K 9/0953* (2013.01); *B23K 9/1087* (2013.01); *G08C 17/02* (2013.01); *H04W 4/80* (2018.02)

(58) Field of Classification Search
CPC ........ B23K 9/00; B23K 9/095; B23K 9/0953; B23K 9/10; B23K 9/1006; B23K 9/1043; B23K 9/1056; B23K 9/1062; B23K 9/1087; G08C 17/00; G08C 17/02; H04W 4/00; H04W 4/80
See application file for complete search history.

(56) References Cited

U.S. PATENT DOCUMENTS

| | | | |
|---|---|---|---|
| 7,245,875 B2 | 7/2007 | Clark | |
| 7,574,172 B2 * | 8/2009 | Clark | H04L 67/04 |
| | | | 455/39 |
| 9,180,544 B2 | 11/2015 | Luck | |
| 9,724,778 B2 | 8/2017 | Denis | |
| 9,943,924 B2 * | 4/2018 | Denis | F02N 11/14 |
| 10,363,627 B2 * | 7/2019 | Denis | H04W 12/50 |
| 10,525,545 B2 | 1/2020 | Denis | |
| 11,103,948 B2 * | 8/2021 | Holverson | G06F 21/35 |
| 2006/0179452 A1 * | 8/2006 | Amodeo | G06F 21/35 |
| | | | 725/39 |
| 2015/0114942 A1 | 4/2015 | Denis | |
| 2016/0045971 A1 * | 2/2016 | Holverson | G06F 21/35 |
| | | | 219/136 |

OTHER PUBLICATIONS

Lincoln Electric, Inc., Operator's Manual, Power Wave Manager, IM8002, Issue date Jul. 19 (180 pages).
Fronius, Commissioning Fronius Monitoring via Smart Phone/Tablet, Using the Datamanager V 2.0, Fronius Australia Pty, Ltd., Jan. 2015 (10 pages).

* cited by examiner

*Primary Examiner* — Janie M Loeppke
*Assistant Examiner* — Theodore J Evangelista
(74) *Attorney, Agent, or Firm* — McAndrews, Held & Malloy, Ltd.

(57) ABSTRACT

Disclosed is welding-type power supply including wireless communications circuitry that is configured to host a first wireless communication network and connect as a client to a second wireless communication network. Welding-type power supply settings and welding-type power supply data may be communicated via the first wireless communication network and the second wireless communication network.

21 Claims, 7 Drawing Sheets

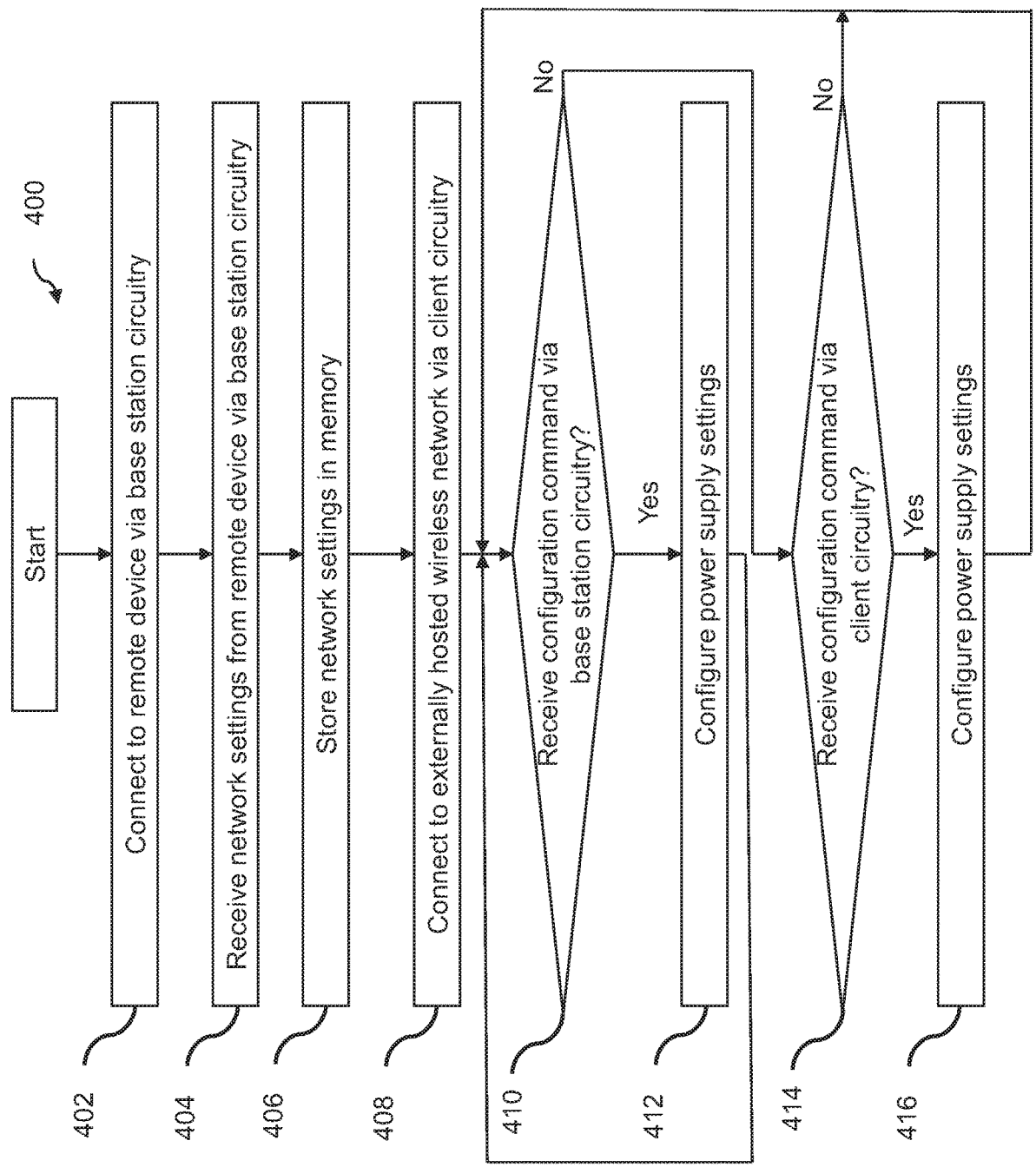

(1)

WIRELESS WELDING-TYPE POWER SUPPLY MANAGEMENT

BACKGROUND

The present disclosure relates to welding systems, and more particularly wireless communication and management of welding-type power supplies.

Welding-type power supplies convert input power to welding-type output power suitable for use in a welding-type operation. In some examples, welding-type power supplies generate the power that is converted into the welding-type output power. Conventionally, welding-type power supplies are controlled via a control panel disposed on an exterior surface of an enclosure of the welding-type power supply unit. In some environments, welding operators perform welding operations at locations that are at relatively large distances away from the welding-type power supply units. With conventional welding power supplies, in such situations, the welding operators may have to walk all the way back to the welding power source to modify settings of the welding operations.

SUMMARY

The present disclosure relates generally to welding-type power sources, and more specifically to welding-type power supply units including wireless communications circuity configured to host a wireless communication network and connect to externally hosted wireless communication networks, substantially as illustrated by and described in connection with at least one of the figures, as set forth more completely in the claims.

DRAWINGS

FIG. 4 is a flowchart illustrating additional example machine readable instructions which may be executed by the example welding-type power supply of FIG. 1 to connect to an external wireless communication network and receive power supply configuration commands.

The figures are not necessarily to scale. Where appropriate, similar or identical reference numbers are used to refer to similar or identical components.

DETAILED DESCRIPTION

Figure 1:
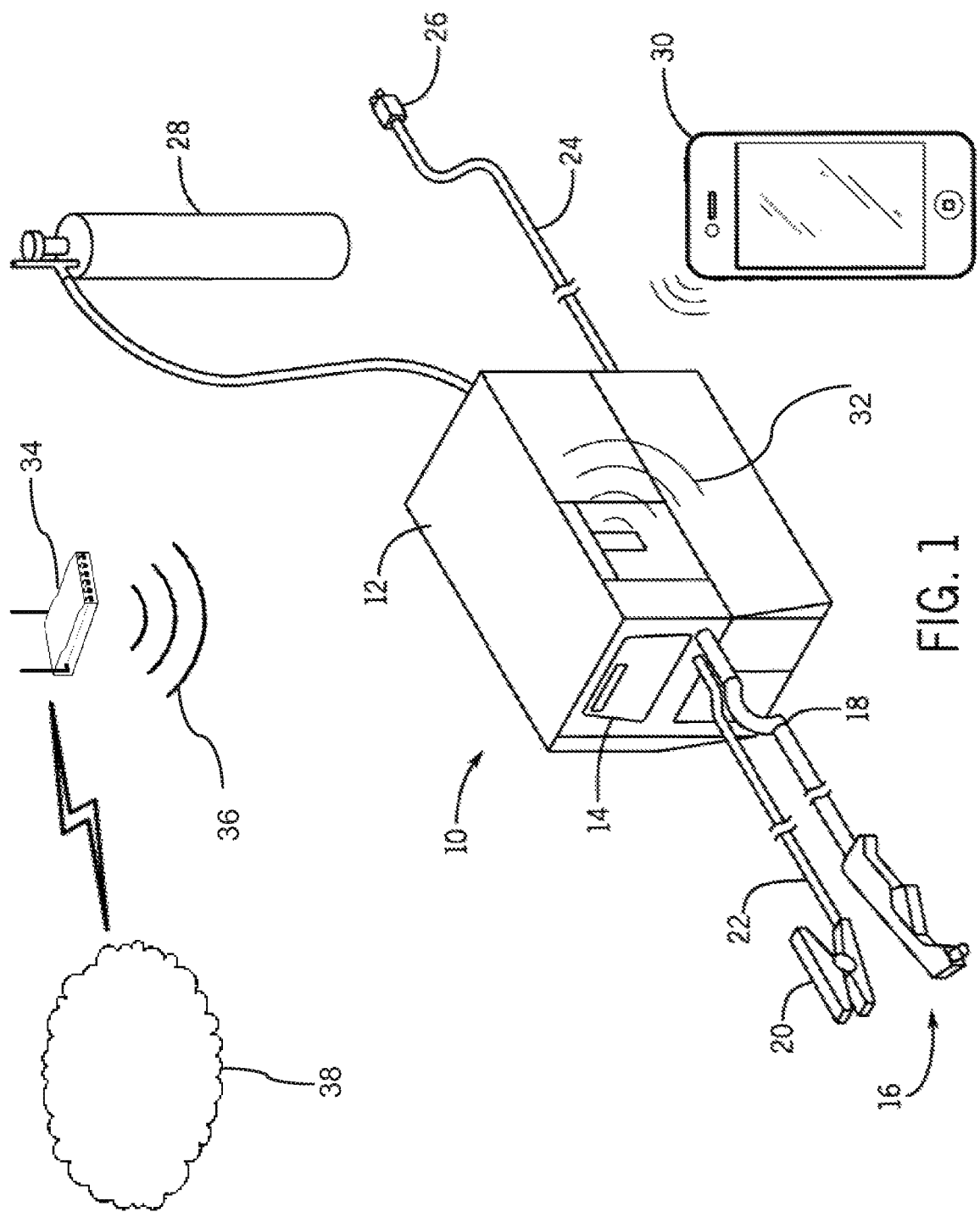
FIG. 1 illustrates a welding-type system including a welding-type power supply configured to host a wireless communication network to communicate wirelessly with a wireless remote control device and connect to an externally hosted wireless communication network.

In some welding environments, (e.g., a shipbuilding yard, warehouse, construction area), welding operators may perform welding-type operations at relatively large distances from a welding-type power supply. In conventional welding systems, welding-type power supplies are controlled via a control panel disposed on an exterior surface of an enclosure of the welding-type power supply unit. With conventional welding-type power supplies, the welding operators may have to walk all the way back to the welding-type power supply to modify settings of the welding-type operations.

Some welding environments may have an established wireless communication network, for example a Wi-Fi network (IEEE 802.11x). For example, a welding environment may include one or more routers or access points that host a wireless area network to which client devices can connect. Conventional welding-type power supplies may include wireless communication circuitry enabling the welding-type power supply to communicate via the established wireless communication network of the welding environment. Conventional welding-type power supplies must be connected to the established wireless communication network of the welding environment prior to communicating via the said wireless communication network. To connect a conventional welding-type power supply to the established wireless communication network, an operator must enter network settings (e.g., Service Set Identifier ("SSID") and password) to the welding-type power supply. For example, these network settings may be input to the welding-type power supply via inputting the settings via a user interface of the welding-type power supply; via a computing device connected to the welding-type power supply via Ethernet; or via uploading the settings from a USB drive into the welding-type power supply via a USB port of the welding-type power supply.

Once the conventional welding-type power supply is connected to the established wireless communication network of the welding environment, the welding-type power supply can be communicated with and controlled wirelessly. For example, a welding operator may configure weld settings of the welding-type power supply wirelessly from a remote computing device without walking back to the welding-type power supply to configure settings via the user interface. Additionally, welding-type power supply information (e.g., weld data and/or diagnostics) may be uploaded, (e.g., to a server) via the established wireless communication network. Within the welding environment, the welding-type power supply may be physically moved without having to reestablish a connection with the established wireless communication network.

As explained above, conventional connection techniques require an operator to physically be at the location of the welding-type power supply in order to connect the welding-type power supply to the established wireless communication network of the welding environment. The present disclosure relates to a welding-type power supply that includes base station circuitry (e.g., Wi-Fi access point circuitry) which hosts a wireless communication network. A welding operator may wirelessly connect to the wireless communication network hosted by the base station circuitry of the welding-type power supply (e.g., via a mobile computing device such as a tablet, laptop, or smartphone). Once connected to the welding-type power supply via the wireless communication network hosted by the base station circuitry of the welding-type power supply, the welding operator may configure the welding-type power supply to connect to the wireless communication network of the welding environment. Thus the welding operator does not need to be at the physical location of the welding-type power supply to connect the welding-type power supply to the established wireless communication network. The operator may connect the welding-type power supply to the established wireless communication network if the operator is within range of the wireless communication network hosted by the base station circuitry of the welding-type power supply. Additionally, the welding operator may directly configure power source settings via the wireless connection hosted by base station circuitry of the welding-type power supply.

The terms "welding-type system," "welding-type power source," and "welding-type power supply," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and "controller," as used herein, may include digital and/or analog circuitry, discrete and/or integrated circuitry, microprocessors, digital signal processors (DSPs), and/or other logic circuitry, and/or associated software, hardware, and/or firmware. Control circuits, controllers, or control circuitry may be located on one or more circuit boards, that form part or all of a controller, and are used to control a welding process, a device such as a power source or wire feeder, motion, automation, monitoring, air filtration, displays, and/or any other type of welding-related system.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process," "welding-type operation," or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

FIG. 1 illustrates an example welding system 10 for performing welding-type operations. The welding-type system 10 may be configured to perform one or more welding-type operations (e.g., tungsten inert gas (TIG), metal inert gas (MIG), stick welding, plasma cutting). The welding-type system 10 includes a welding-type power supply 12 which conditions input power (e.g., grid power) and generates output power suitable for welding-type applications. The welding-type power supply 12 includes a control panel or user interface 14 through which an operator may adjust operating parameters of the welding-type system 10. A torch 16 is connected to the welding-type power supply 12 via a torch cable 18 that provides the torch 16 with power and compressed air or shielding gas. A work clamp 20 is also connected to the welding-type power supply 12 via a return cable 22 to provide a return path for the welding current from the torch 16 and through the workpiece. A power cable 24 having a plug 26 connects the power supply to an external source of power (e.g., the grid or an engine/generator). A gas source 28 is also connected to the welding-type power supply 12.

The example welding-type power supply 12 is configured to communicate wirelessly. The welding-type power supply 12 includes wireless communication circuitry configured to communicate with a remote control device 30. The remote control device 30 may be any type of portable electronic device, such as a smart phone, tablet computer, laptop computer, and so forth. The remote control device 30 may have software or firmware (as well as security keys) installed thereon to control the welding-type power supply 12. In some examples, the welding-type power supply 12 includes base station circuitry configured to host a wireless communication network 32. For example, the welding-type power supply 12 may include Wi-Fi access point circuitry configured to host a Wi-Fi wireless area network. The base station circuitry may transmit a unique identifier (e.g., the power supply serial number) as the SSID. The remote control device 30 may connect to the wireless communication network 32 hosted by the welding-type power supply 12 (e.g., by selecting the wireless network 32 in a list of available wireless networks displayed on a display of the remote control device 30). An operator may then input the unique identifier of the welding-type power supply 12 into the web browser of the remote control device. The operator may then be directed to welding-type power supply configuration web pages. In some examples, all web page requests may be automatically redirected to the welding-type power supply 12 configuration page while the remote control device 30 is connected to the wireless communication network 32.

The environment that the welding system 10 is located in (e.g., a shipbuilding yard, warehouse, construction area) includes at least one router 34 which hosts a second wireless communication network (e.g., a Wi-Fi network) 36. The second wireless communication network 36 may be connected to the internet or an intranet (e.g., an internal network) 38. The wireless communication circuitry of the welding-type power supply 12 is configured to communicate with the wireless communication network 36 of the welding environment. For example, the welding-type power supply 12 may include Wi-Fi client circuitry. Before the welding-type power supply 12 may communicate via the externally hosted wireless communication network 36, the welding-type power supply 12 must receive network settings of the wireless communication network 36 (e.g., the SSID and password for the network 36). In the present disclosure, an operator may input settings of the wireless communication network 36 to the welding-type power supply 12 via transmitting said settings from a remote control device 30 to the power supply 12 over the wireless communication network 32. Accordingly, an operator does not need to manually load the settings of the wireless communication network 36 into the welding-type power supply 12 at the physical location of the welding-type power supply 12.

Figure 2:
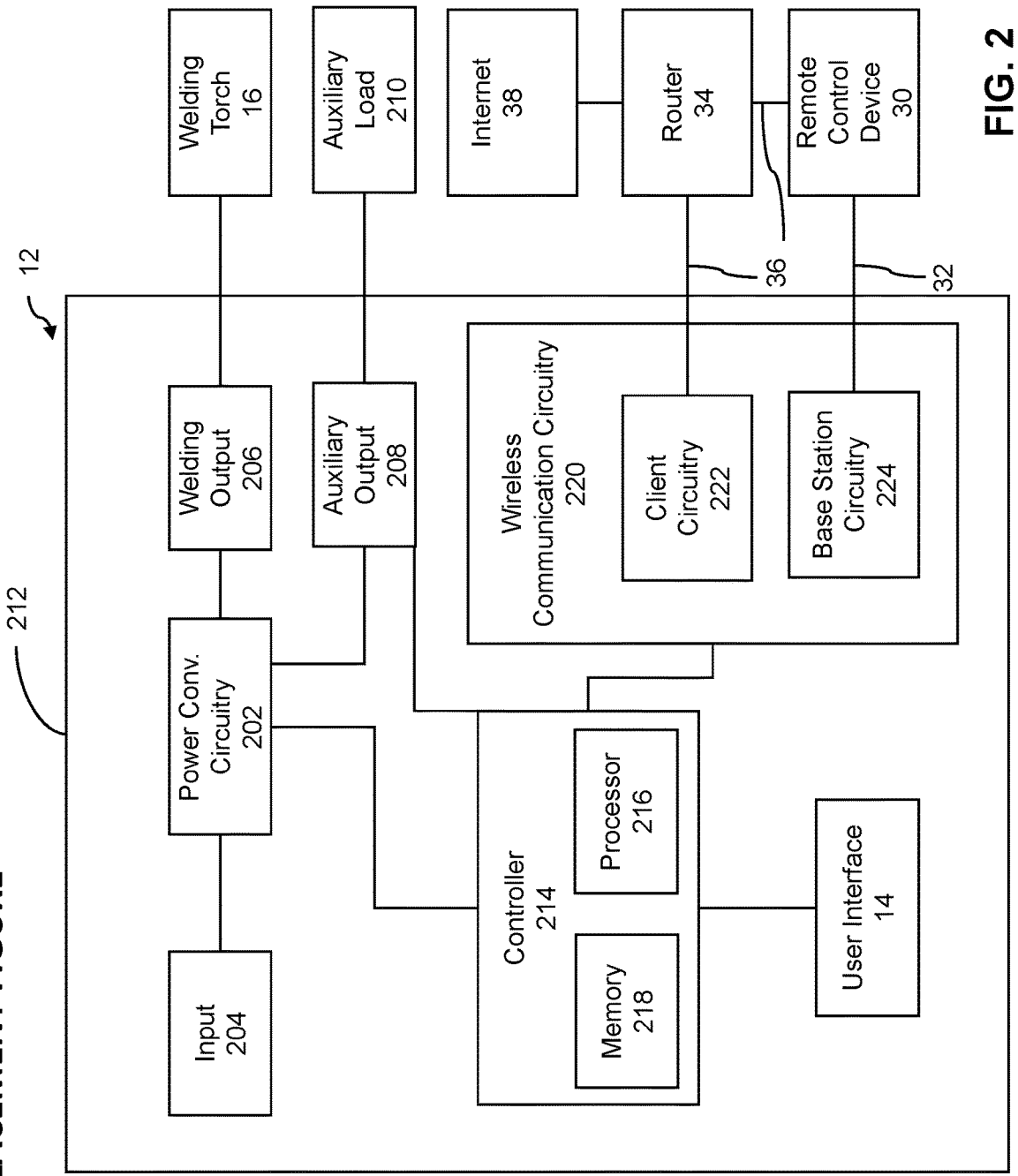
FIG. 2 is a block diagram of the welding-type power supply of FIG. 1.

FIG. 2 is a block diagram of the welding system 10 of FIG. 1. The welding-type power supply 12 includes power conversion circuitry 202 which converts power received at the input 204 to welding-type power at the output 206, which is delivered to the torch 16. In some examples, the welding-type power supply 12 may receive power from the grid or from an engine/generator. In some examples, rather than receiving power from an external source, the welding-type power supply 12 may include an engine and generator, and the power conversion circuitry 202 conditions power generated by the engine and generator. In some examples, the power conversion circuitry 202 may also condition power which is provided to an auxiliary output 208 in order to provide power to an auxiliary load 210 (e.g., a wire feeder, a grinding machine, a lighting system, a fan). The components of the welding-type power supply 12 may be contained in a common housing or enclosure 212.

The welding-type power supply 12 includes a controller 214 configured to control operation of the welding-type power supply 12. The controller 214 includes one or more processor(s) 216 configured to execute program instructions stored in a tangible non- transitory computer-readable medium, such as the memory 218. The processor(s) 216 may include a general purpose processor, system-on-chip (SoC) device, application- specific integrated circuit (ASIC), or other processor configuration. Similarly, the memory 218 may include, for example, random-access memory (RAM), read-only memory (ROM), flash memory (e.g., NAND), and so forth. In some examples, the memory 218 may store instructions for controlling the components of the welding-type power supply 12, for example the power conversion circuitry 202, which may be executed by the processor 216. The controller 214 may receive one or more instructions, for example from the user interface 14, and control one or more operations of the welding-type power supply 12 based on the received instructions. For example, an operator may specify the type of welding process (e.g., AC stick welding, AC TIG welding, DC stick welding, DC MIG welding, etc.), voltage and/or current settings for the welding process, and so forth, and the controller 214 may determine appropriate settings for the power conversion circuitry 202 based on the operator input. In some examples, the controller 214 may also receive information and/or send commands to the auxiliary load, for example via the auxiliary output. For example, the controller may receive wire feeder information or transmit commands to a wire feeder (e.g., wire feed speed commands).

The welding-type power supply 12 also includes wireless communication circuitry 220, configured to facilitate wireless communication between the welding-type power supply 12 and remote devices. The wireless communications circuitry includes client circuitry 222 configured to connect to and communicate with an externally hosted wireless communication network 36. The wireless communication network 36 may be a Wi-Fi network of the environment in which the power supply 12 is located. The wireless communication network 36 may be hosted by a router or access point 34. The router or access point 34 may be in communication with the internet, an intranet, and/or a server 38. One or more computing devices, such as a remote control device 30 may also be connected to the wireless communication network 36. The client circuitry 222 may include one or more processor(s) (i.e., similar to the one or more processor(s) 216 of the controller 214 of the power supply 12) configured to execute program instructions stored in a tangible non-transitory computer-readable medium (i.e., similar to the memory 218 of the controller 214 of the power supply 12) for enabling the wireless communication with the router 34, including pairing with the router 34.

The wireless communication circuitry 220 also includes base station circuitry 224 configured to host a wireless communication network 32. The base station circuitry 224 may be, for example, an 802.11x access point. In some examples, the base station circuitry 224 may be configured to communicate via a point to point wireless protocol with a remote device 30. For example, the base station circuitry 224 may be configured to communicate via Bluetooth (e.g., be configured as a Bluetooth master node), Bluetooth Low Energy, or the like. The base station circuitry 224 may include one or more processor(s) (i.e., similar to the one or more processor(s) 216 of the controller 214 of the welding-type power supply 12) configured to execute program instructions stored in a tangible non-transitory computer-readable medium (i.e., similar to the memory 218 of the controller 214 of the welding-type power supply 12) for enabling the wireless communication with one or more remote devices 30, including pairing with the remote device 30. In some examples, security keys that are used to check whether the base station circuitry 224 is authorized to communicate with the wireless remote control device 30, and vice versa, may be stored in the computer-readable medium of base station circuitry 224. In some examples, the base station circuitry 224 may be configured to communicate with only one wireless device at a time (e.g., receive commands from only one remote control device 30).

It will be appreciated that while the controller 214 and the wireless communication circuitry 220 (including the client circuitry 222 and the base station circuitry 224) are described herein as being separate components, in certain embodiments, the controller 214 and the wireless communication circuitry 220 may collectively function as integrated control circuitry of the welding-type power supply 12.

The wireless communication circuitry 220 may also include one or more processor(s) (i.e., similar to the one or more processor(s) 216 of the controller 214 of the power supply 12) configured to execute program instructions stored in a tangible non-transitory computer-readable medium (i.e., similar to the memory 218 of the controller 214 of the power supply 12) for enabling prioritization of control between the welding-type power supply 12, commands received via the wireless network 32, and/or commands received via the wireless communication network 36, thereby enabling control of the welding-type power supply 12 via the remote control device 30 or another computing device.

Figure 3A:
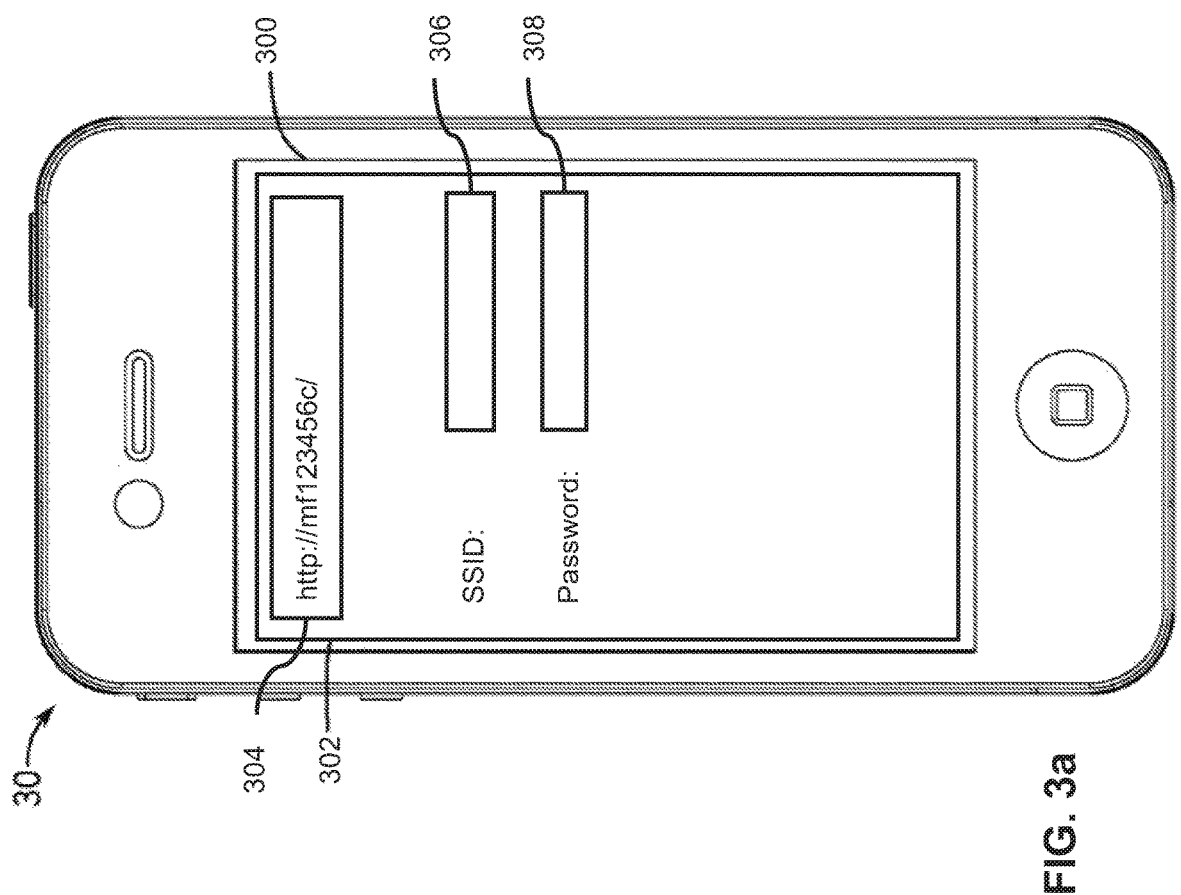
FIG. 3a illustrates the wireless remote control device configured to connect to welding-type power supply of FIGS. 1 and 2 via the wireless communication network hosted by the welding-type power supply.

FIG. 3a illustrates an example interface of a remote control device 30 that may be used to configure wireless connection settings for the welding-type power supply 12. As illustrated in FIG. 3a, an operator of the remote control device 30 may navigate on the display 300 to the web browser 302 of the remote control device. In some examples, the operator may navigate on the display 300 to a dedicated application for configuring welding power supplies, such as the welding-type power supply 12. After navigating to the browser 302 (or to a dedicated application) the operator may then type a preconfigured unique identifier, for example, an IP address of the welding-type power supply 12 for the wireless communication network 32 hosted by the base station circuitry 224, into the address bar 304 of the browser 302. Typing in the unique identifier into the address bar 304 brings up a wireless network configuration page for the welding-type power supply 12 associated with the unique identifier. At the wireless network configuration page, the operator may input the information to connect to the externally hosted wireless communication network 36 of the welding environment. For example, at the wireless network configuration page, the operator may input the SSID 306 and password 308 for the wireless communication network 36. After the operator inputs network configuration settings (e.g., the SSID and password), the network configuration settings are transmitted from the remote control device 30 to the controller 214 via the wireless communication network 32 hosted by the base station circuitry 224. The controller 214 may store the network settings in memory 218, and use the settings to connect to the wireless communication network 36 of the welding environment via the client circuitry 222.

In some examples, the remote control device 30 may automatically connect to the wireless communication network 32 when in range of the wireless communication network. In some examples, once the remote control device is connected to the wireless communication network, when the operator opens the browser (or a dedicated application), the browser may automatically redirect to the wireless network configuration page.

In some examples, an operator may select the wireless communication network 32 (e.g., based on the name or other unique identifier of the wireless communication network 32) from a list of available wireless communication networks shown on the display 300. For example, the base station circuitry 224 may broadcast a unique identifier (e.g., an SSID), which an operator may select on the display 300. In some examples, once the operator selects the wireless communication network 32 from the list of available wireless communication networks, the operator will be prompted to input a password to connect to the wireless communication network. The password is then transmitted to the controller 214 via the base station circuitry 224. If the received password matches the correct password, the remote control device 30 is paired to the welding-type power supply 12 via the wireless communication network 32. In some examples, once the password is accepted and the remote control device is paired to the welding-type power supply via the wireless communication network 36, the remote control device 30 will automatically redirect to a configuration page (e.g., of a browser or a dedicated application).

Once the operator transmits the network settings to the welding-type power supply 12, the controller 214 controls the welding-type power supply 12 to connect to the externally hosted wireless communication network 36 of the welding environment via the client circuitry 222. As described in more detail below, other wireless devices connected to the wireless communication network 36 may receive information from the welding-type power supply and/or transmit commands to the welding-type power supply 12. The remote control device 30 may continue to communicate with the welding-type power supply 12 via the wireless communication network 32 hosted by the base station circuitry. In some examples, the remote control device 30 may also be connected to the wireless communication network 36 of the welding environment. The remote control device 30 may communicate with the welding-type power supply 12 via the wireless communication network 32 or the wireless communication network 36. Additionally, welding-type power supply data may be uploaded to the internet, an intranet, and/or a server 38 via the wireless communication network 36.

Figure 3B:
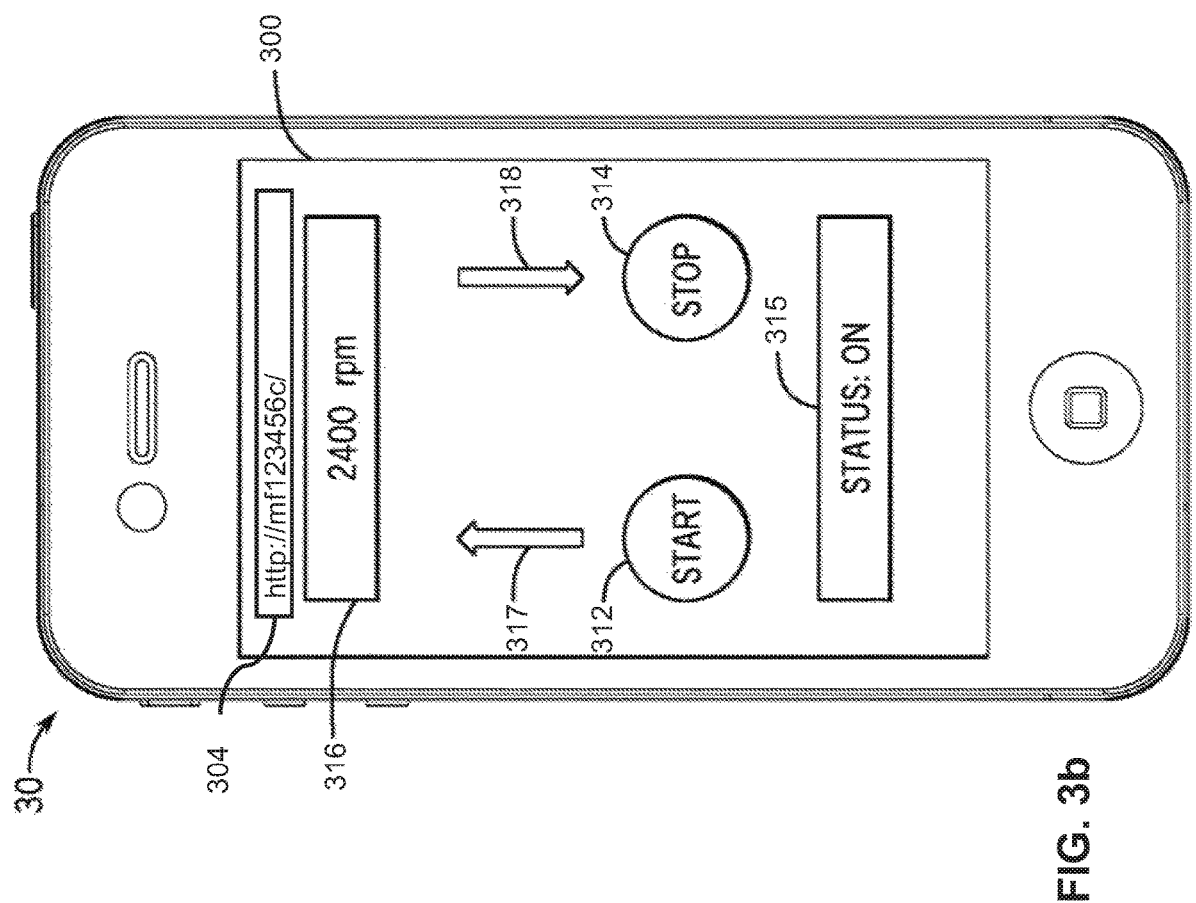
FIG. 3b illustrates a view of the wireless remote control device configured to communicate wirelessly with the welding-type power supply to control an engine of the welding-type power supply.
Figure 3C:
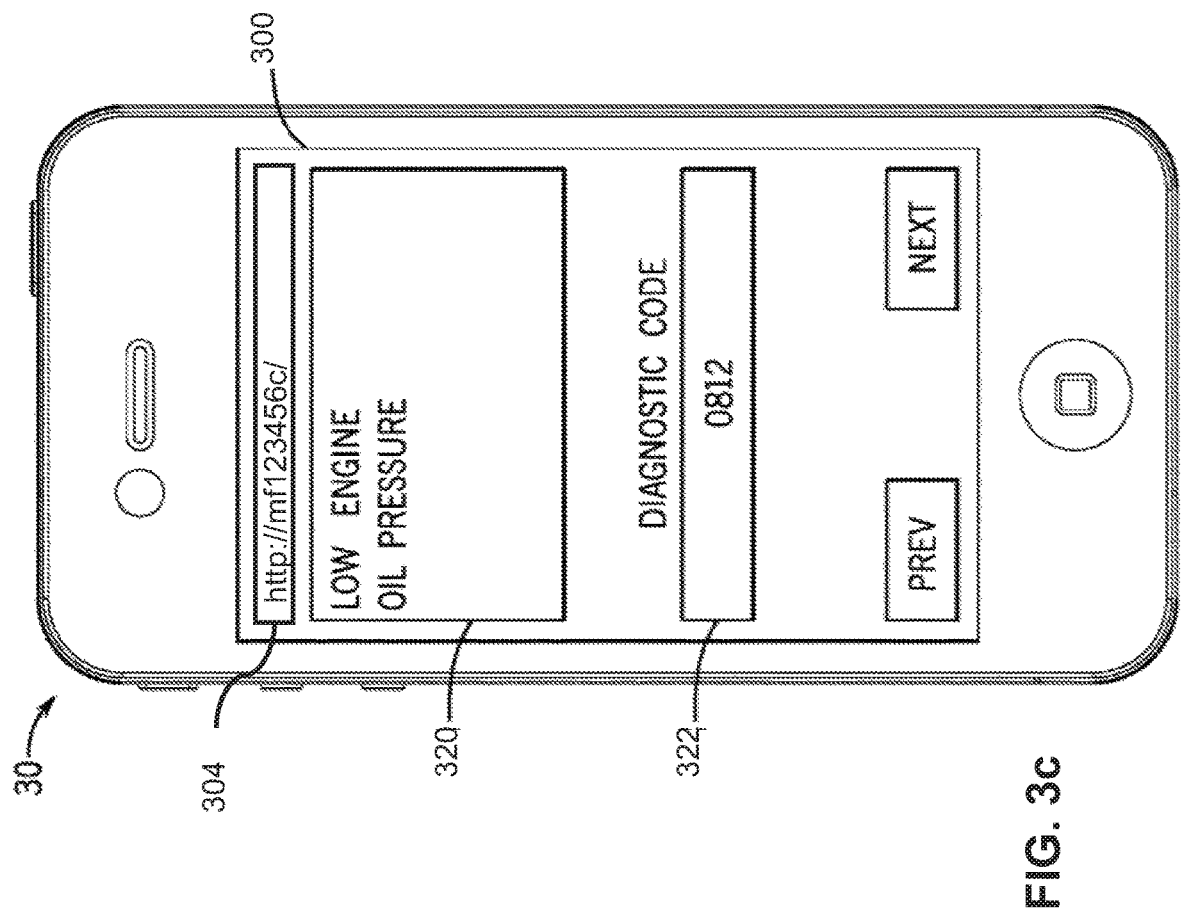
FIG. 3c illustrates a view of the wireless remote control device configured to communicate wirelessly with the welding-type power supply to receive diagnostic messages from the welding-type power supply.
Figure 3D:
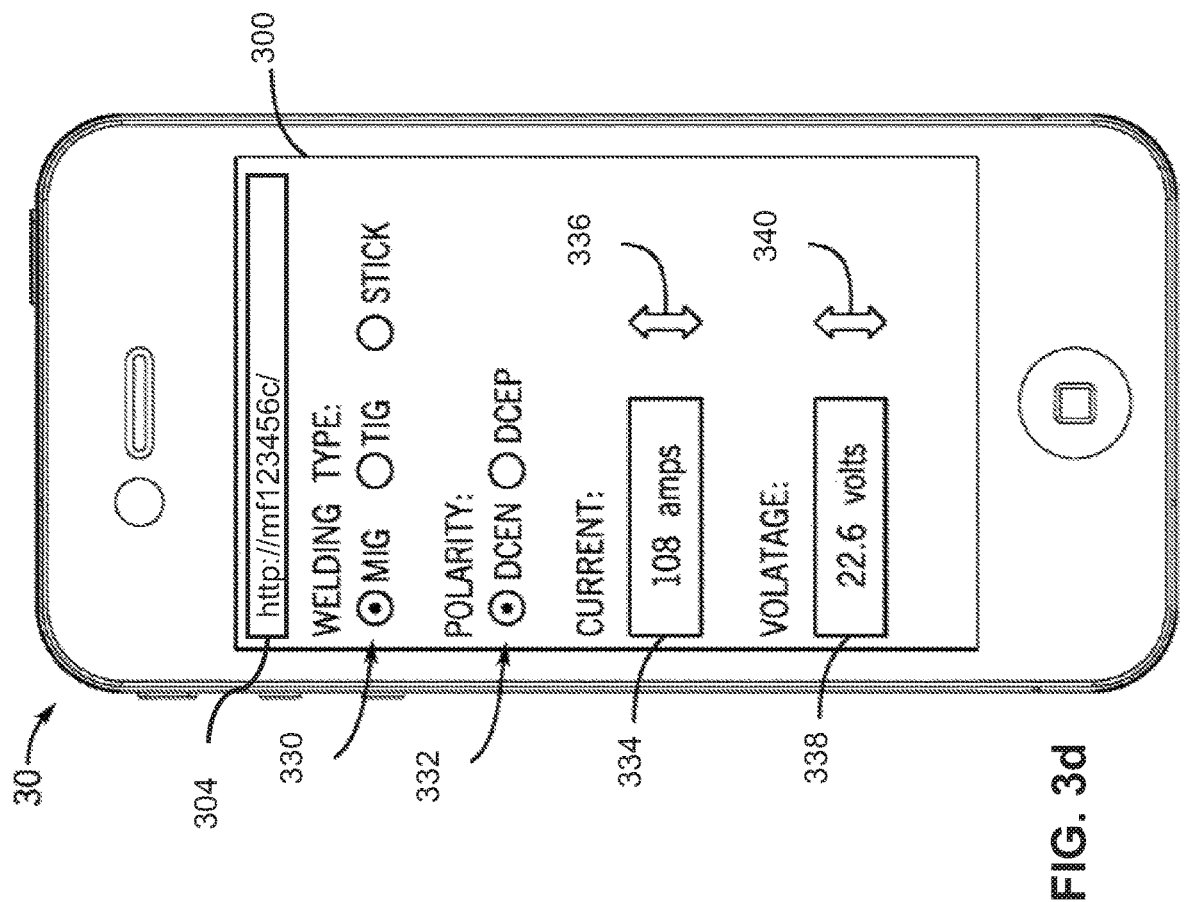
FIG. 3d illustrates a view of the wireless remote control device configured to communicate wirelessly with the welding-type power supply to control one or more operating parameters of the welding-type power supply.

Once the remote control device 30 and the welding-type power supply 12 are connected with each other (via either the wireless communication network 32 or the wireless communication network 36), as described in greater detail herein, for example with respect to FIGS. 3b-3d, any number of operational parameters and statuses of the welding-type power supply 12 may be controlled by the remote control device 30.

In some examples, the control panel 14 of the welding-type power supply 12 and the remote control device 30 (e.g., via its display 300) may provide substantially similar functionality for control of the welding-type power supply 12. In particular, in certain embodiments, a unified, nested menu structure for controlling the welding-type power supply 12 may be displayed on and manipulated from the control panel 14 of the welding-type power supply 12 and the display 300 of the remote control device 30.

The menu structure may be dependent upon the type of welding-type power supply 12 being controlled, or the specific features available on a welding-type power supply 12 of a given type. For example, the menu structure for a TIG welding power supply 12 will be different than the menu structure for a multi-process engine-driven welding-type power supply 12. The menu structure enables the remote control device 30 to generally duplicate the control features available on the welding-type power supply 12 to which it is connected. The control features available from the remote control device 30 may be the same as the control features available from the welding-type power supply 12 (e.g., via the control panel 14). In some examples, advanced control features may be enabled through the remote control device 30 that are otherwise not available from the welding-type power supply 12 (e.g., via the control panel 14). For example, additional control features may be presented via the nested menu structure that is presented on the display 300 of the remote control device 30 that are not available via the control panel 14 of the welding-type power supply 12. In some examples, the remote control device 30 may control a welding-type power supply 12 having a control panel 14 that does not have a display capable of displaying a substantially similar nested menu structure.

In examples where the welding-type power supply 12 includes an engine and generator, the engine of the welding-type power supply 12 may be started using the remote control device 30. In such an example, as shown in FIG. 3b, an operator of the remote control device 30 may, for example, navigate to a page on the browser 302 (or of a dedicated application) for adjusting engine settings. Once on the engine configuration page, the operator may press a virtual start button 312 on the display 300 of the remote control device 30, thereby causing a control signal to be sent wirelessly from the remote control device 30 to the controller 214 of the welding-type power supply 12 via the wireless communication circuitry 220 (e.g., via the base station circuitry 224 if connected via the wireless communication network 32 or via the client circuitry 222 if connected via the wireless communication network 36) of the welding-type power supply 12. In response to this control signal, based at least in part on the received control signal (as well as other operating parameters), the controller 214 may cause the engine of the welding-type power supply 12 to start, thereby generating power for the welding operation of the welding-type power supply 12.

The engine may also be stopped using the remote control device 30. In such examples, an operator of the remote control device 30 may, for example, press a virtual stop button 314 on the display 300 of the remote control device 30, thereby causing a control signal to be sent wirelessly from the remote control device 30 to the controller 214 of the welding-type power supply 12 via the wireless communication circuitry 220 of the welding-type power supply 12. In response to this control signal, the controller 214 may cause the engine the welding-type power supply 12 to stop, thereby ceasing generation of power for the welding operation of the welding-type power supply 12. In addition, the current operating status (i.e., ON or OFF) of the engine may be communicated to the remote control device 30 wirelessly from the controller 214 of the welding-type power supply 12 via the wireless communication circuitry 220, and indicated on a virtual indicator 315 on the display 300 of the remote control device 30. The controller 214 may send engine RPM data to the remote control device 30 at time intervals to serve as a status indication to the operator via the remote control device 30, where the engine RPM is displayed on a virtual indicator 316 on the display 300 of the remote control device 30. In some examples, an operator of the remote control device 30 may, for example, manipulate increase/decrease slider elements on the remote control device 30 or virtual increase/decrease slider elements 317, 318 on the display 300 of the remote control device 30, as illustrated in FIG. 3b, thereby causing a control signal to be sent wirelessly from the remote control device 30 to the controller 214 of the welding-type power supply 12 via the wireless communication circuitry 220 of the welding-type power supply 12, the control signal being used by the controller 214 to increase or decrease the operating speed of the engine of the welding-type power supply 12 based at least in part on the received control signal (as well as other operating parameters).

In some examples, the welding output 206 of the welding-type power supply 12 may be turned on and off (e.g., a contactor, a solid state control, or some other mechanism, may be activated or deactivated) using the remote control device 30. Further, the current operating status (i.e., ON or OFF) of the welding output 206 may be communicated to the remote control device 30 wirelessly from the controller 214 of the welding-type power supply 12 via the wireless communication circuitry 220, and indicated on the remote control device 30. It will be appreciated that any type of welding-type power supply 12, line-powered, engine-driven, or otherwise, may communicate with the remote control device 30 in this manner.

Many other operating parameters and statuses of the welding-type power supply 12 may be wirelessly communicated to the remote control device 30 from the controller 214 of the welding-type power supply 12 via the wireless communication circuitry 220, and displayed on virtual indicators on the display 300 of the remote control device 30. For example, the engine fuel level, time to next oil change, total amount of time the engine has been in use (e.g., lifetime hours), total amount of time the welding-type power supply 12 has been in use, etc., may be displayed on the remote control device 30.

As illustrated in FIG. 3c, in some examples, diagnostic messages and/or diagnostic codes for the welding-type power supply 12 may be indicated on virtual indicators 320, 322 on the display 300 of the remote control device 30. The messages may be viewed on a web browser of the remote control device 30 or a dedicated welding-type power supply configuration application running on the remote control device 30. Using the remote control device 30 to wirelessly control the welding-type power supply 12 may facilitate communication of welding-type power supply diagnostic messages and/or diagnostic codes that may otherwise not be communicable to the operator, for example, via the control panel 14 of the welding-type power supply 12. For example, the control panel 14 of the welding-type power supply 12 may not include a display capable of displaying detailed diagnostic messages, whereas the display 300 of the remote control device 30 is capable of displaying myriad detailed diagnostic messages. In some examples, the welding-type power supply 12 may be located a significant distance from the operator, and thus it may be advantageous for the operator to be able to view diagnostic information via the remote control device 30 without going to the physical location of the welding-type power supply 12. Diagnostic messages that may be indicated on the display 300 of the remote control device 30 may include, for example, diagnostic codes for the welding-type power supply 12 in general (e.g., temperature too high, current too high, voltage too low or too high, thermistor failure, PC board failure, power supply failure, and so forth), diagnostic codes for major components of the welding-type power supply 12 (e.g., an engine, a generator, a compressor, a hydraulic pump, the power conversion circuitry 202, the welding power output 206, an auxiliary power output, the controller 214, the wireless communication circuitry 220, and so forth) as well as diagnostic codes for devices connected to the welding-type power supply 12 (e.g., the welding torch 16, a wire feeder).

The remote control device 30 may also be used to wirelessly control operating parameters relating to the welding output 206 of the welding-type power supply 12, which may affect the delivery of the welding power to the welding torch 16. For example, as illustrated in FIG. 3c, in some examples, the operator may navigate to a page on a web browser of the remote control device 30 or a dedicated welding-type power supply configuration application running on the remote control device 30 for controlling operating parameters. The operator may select the type of welding process (e.g., stick, MIG, TIG, etc.) being performed by the welding-type power supply 12 at the remote control device 30. An operator of the remote control device 30 may select the type of welding process being performed by the welding-type power supply 12 via a virtual selector 330 on the display 300 of the remote control device 30, as illustrated in FIG. 3d. Based on the selection, a control signal may be sent wirelessly from the remote control device 30 to the controller 214 of the welding-type power supply 12 via the wireless communication circuitry 220 of the welding-type power supply 12. In response to this control signal, the controller 214 may change the type of welding process consistent with the selection made by the user via the remote control device 30.

In some examples, the polarity (e.g., DCEN, DCEP, and so forth) of the welding process being performed by the welding-type power supply 12 may be controlled by the remote control device 30. In such examples, an operator of the remote control device 30 may select the polarity of the welding process being performed by the welding-type power supply 12 via a selector on the remote control device 30 or a virtual selector 332 on the display 300 of the remote control device 30, as illustrated in FIG. 3d. Based on the selection, a control signal may be sent wirelessly from the remote control device 30 to the controller 214 of the welding-type power supply 12 via the wireless communication circuitry 220 of the welding-type power supply 12. In response to this control signal, the controller 214 may change the polarity of the welding process consistent with the selection made by the user via the remote control device 30.

In some examples, the current and/or voltage of the welding process being performed by the welding-type power supply 12 may be displayed on the remote control device 30 and controlled via control elements on the remote control device 30. For example, the welding current being delivered to the welding torch 16 via the welding output 206 of the welding-type power supply 12 may be communicated to the remote control device 30 wirelessly from the controller 214 of the welding-type power supply 12 via the wireless communication circuitry 220, and indicated on an indicator of the remote control device 30 or a virtual indicator 334 on the display 300 of the remote control device 30.

In some examples, an operator of the remote control device 30 may, for example, manipulate virtual increase/decrease slider elements 336 (or virtual buttons, virtual knobs, and so forth) on the display 300 of the remote control device 30, thereby causing a control signal to be sent wirelessly from the remote control device 30 to the controller 214 of the welding-type power supply 12 via the wireless communication circuitry 220 of the welding-type power supply 12, the control signal being used by the controller 214 to increase or decrease the welding current being delivered to the welding torch 16 via the welding output 206 of the welding-type power supply 12.

Similarly, the welding voltage being delivered to the welding torch 16 via the welding output 206 of the welding-type power supply 12 may be communicated to the remote control device 30 wirelessly from the controller 214 of the welding-type power supply 12 via the wireless communication circuitry 220, and indicated on a virtual indicator 338 on the display 300 of the remote control device 30.

In some examples an operator of the remote control device 30 may, for example, manipulate virtual increase/decrease slider elements 340 on the display 300 of the remote control device 30, thereby causing a control signal to be sent wirelessly from the remote control device 30 to the controller 214 of the welding-type power supply 12 via the wireless communication circuitry 220 of the welding-type power supply 12, the control signal being used by the controller 214 to increase or decrease the welding voltage being delivered to the welding torch 16 via the welding output 206 of the welding-type power supply 12.

Other operating parameters of the welding-type power supply 12 and operating parameters of auxiliary devices 210 connected to the welding-type power supply 12 (e.g., a wire feeder), may be wirelessly controlled by the remote control device 30 and other operating parameters and statuses of the welding-type power supply 12 and auxiliary devices 210 connected to the welding-type power supply 12 may be indicated on the remote control device 30. The operating parameters and statuses described with respect to FIGS. 3b-3d are merely exemplary, and not intended to be limiting. For example, in some examples, in addition to displaying and/or controlling welding voltage and welding current via the remote control device 30, welding voltage presets and welding current presets may be displayed and/or controlled via the remote control device 30. In some examples, the presets may be displayed and/or controlled as actual welding voltage preset values or actual welding current preset values, while in other embodiments, the presets may be displayed and/or controlled as percentages of welding voltage or welding current.

In some examples, the remote control device 30 may be used to add functionality to the welding-type power supply 12. For example, an operator may use the remote control device 30 to select functionality that is added to the welding-type power supply 12. For example, the user may select a certain advanced welding process, such as a pulsed MIG welding process, via the display 300 of the remote control device 30 as process functionality that is desired by the operator but that is not currently enabled in the welding-type power supply 12. In such examples, upon selection of the advanced welding process (e.g., via the display 300 of the remote control device 30), the remote control device 30 may wirelessly transmit the functionality (e.g., software) to the welding-type power supply 12, which may then be stored in the welding-type power supply 12 (e.g., in the memory 218) and used by the controller 214 of the welding-type power supply 12, thereby enabling the advanced welding process in the welding-type power supply 12. Alternatively, in certain embodiments, selection of advanced welding processes by the user via the remote control device 30 may initiate the functionality being downloaded into the welding-type power supply 12 from an external source such as the internet 38, for example.

In some examples, a method for prioritization of control between the control panel 14 of the welding-type power supply 12, a remote control device 30a connected via the wireless communication network 32, and a remote control device 30b (or other device connected to the internet or intranet) connected via the communication network 36 may be used to ensure that only one of the control panel 14 of the welding-type power supply 12, the remote control device 30a, and the remote control device 30b may be used to control the welding-type power supply 12 at any given time. In certain embodiments, prioritization of control between the control panel 14 of the welding-type power supply 12 and the remote control device 30 may be effectuated via an input device (e.g., a switching mechanism, such as a switch, push button, and so forth, in certain embodiments) disposed on the welding-type power supply 12. For example, the welding-type power supply 12 may be configured that the user interface 14 has first priority, a remote control device 30a connected via the wireless communication network 32 has second priority, and a remote control device 30b connected via the wireless communication network 36 has third priority (i.e., commands received from the user interface 14 have first priority, commands received via the base station circuitry 224 have second priority, and commands received via the client circuitry 222 have third priority). The welding-type power supply may be configured or be configurable to prioritize commands in any order.

FIG. 4 is a flowchart illustrating another example machine readable instructions 400 which may be executed by the example controller 214 of the welding-type power supply 12 of FIG. 1 to connect to an external wireless communication network and receive power supply configuration commands.

At block 402, the base station circuitry 224 connects to a remote control device 30. For example, the base station circuitry 224 may transmit a unique identifier. An operator of the remote control device 30 may select the wireless communication network 32 maintained by the base station circuitry 224 (e.g., based on the name or other unique identifier broadcasted by the base station circuitry 224) from a list of available wireless communication networks shown on the display 300. In some examples, once the operator selects the wireless communication network 32 from the list of available wireless communication networks, the operator will be prompted to input a password to connect to the wireless communication network. The password is then transmitted to the controller 214 via the base station circuitry 224. If the received password matches the correct password, the remote control device 30 is paired to the welding-type power supply 12 via the wireless communication network 32. In some examples, a remote control device 30 may automatically connect or pair to the base station circuitry 224 when the remote control device is within range of the wireless communication network maintained by the base station circuitry 224.

At block 404, the controller 214 receives (from the remote control device via the wireless communication network 32 maintained by the base station circuitry 224) network settings for an externally hosted wireless communication network 36. For example, an operator may input into a web page or an application served by the base station circuitry, an SSID and password for an externally hosted wireless communication network 36. The input SSID and password for the externally hosted wireless communication network 36 are then transmitted to the controller 214 via the wireless communication network 32 maintained by the base station circuitry 224.

At block 406, the controller 214 stores the received network settings in memory. At block 408, the controller 214 uses the received network settings to connect to the externally hosted wireless communication network 36. For example, the client circuitry 222 may transmit the SSID and password to a router 34 maintaining the wireless communication network 36, thereby connecting to the wireless communication network 36.

At block 410, the controller 214 checks for a welding-type power supply configuration command received via the wireless communication network 32 maintained by the base station circuitry 224. If the controller 214 received a welding-type power supply configuration command (block 410), then at block 412 the controller configures the welding-type power supply 12 according to the received command. The controller 214 then returns to block 410 and continues to check for configuration commands. If the controller 214 did not receive a welding-type power supply configuration command (block 410), then the controller proceeds to block 414.

At block 414, the controller 214 checks for a welding-type power supply configuration command received via the wireless communication network 36 to which the client circuitry 222 is connected. If the controller 214 received a welding-type power supply configuration command (block 414), then at block 416 the controller configures the welding-type power supply 12 according to the received command. The controller 214 then returns to block 410 and continues to check for configuration commands.

The present methods and systems may be realized in hardware, software, and/or a combination of hardware and software. Example implementations include an application specific integrated circuit and/or a programmable control circuit. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A welding-type power supply comprising:
   power conversion circuitry configured to convert an input power into an output power for a welding-type operation;
   communications circuitry comprising:
      base station circuitry configured to maintain a first wireless communication network; and
      client circuitry configured to connect to a second wireless communication network; and
   control circuitry configured to:
      in response to the client circuitry not being connected to the second wireless communication network and not being configured for connection to the second wireless communication network, receiving a first command by the base station circuitry via the first wireless communication network provided by the base station circuitry, the first command directing the client circuitry of the welding-type power supply to connect to the second wireless communication network, wherein the first command includes network configuration information of the second wireless communication network, and wherein the client circuitry configures network settings of the client circuitry and initiates a connection to the second wireless communication network using the network settings configured using the network configuration information; and adjust one or more settings of the welding-type power supply based on a second command received via the second wireless communication network.

2. The welding-type power supply of claim 1, wherein the first wireless communication network is a first 802.11 network, and the second wireless communication network is a second 802.11 network.

3. The welding-type power supply of claim 2, wherein the base station circuitry is configured as an 802.11 access point.

4. The welding-type power supply of claim 1, wherein the base station circuitry is configured to wirelessly pair with a mobile device via the first wireless communication network.

5. The welding-type power supply of claim 4, wherein the base station circuitry is configured to transmit data relating to the welding-type power supply to the mobile device via the first wireless communication network.

6. The welding-type power supply of claim 4, wherein the second command is received from the mobile device after the mobile device is wirelessly paired to the base station circuitry.

7. The welding-type power supply of claim 4, wherein the base station circuitry is configured to broadcast a service set identifier (SSID).

8. The welding-type power supply of claim 7, wherein the base station circuitry is configured to pair with the mobile device after the base station circuitry receives a matching password from the mobile device via the first wireless communication network.

9. The welding-type power supply of claim 1, wherein the first command includes a password to connect to the second wireless communication network.

10. The welding-type power supply of claim 1, wherein the client circuitry is configured to transmit data relating to the welding-type power supply via the second wireless communication network.

11. The welding-type power supply of claim 1, wherein the control circuitry is configured to adjust one or more settings of the welding-type power supply based on a third command received via the second wireless communication network.

12. The welding-type power supply of claim 11, wherein the one or more settings include at least one of a welding process, a voltage, a current, or a wire-feed speed.

13. The welding-type power supply of claim 1, wherein the second wireless communication network is connected to at least one of the internet or an intranet.

14. The welding-type power supply of claim 1, wherein the base station circuitry is configured to serve a web page to a mobile device paired with the base station circuitry via the first wireless communication network.

15. The welding-type power supply of claim 14, wherein the second command comprises a selection made on the web page at the mobile device.

16. The welding-type power supply of claim 14, wherein the web page displays data relating to the welding-type power supply.

17. The welding-type power supply of claim 14, wherein the web page displays a diagnostic message relating to the welding-type power supply.

18. The welding-type power supply of claim 1, wherein the control circuitry is configured to prioritize between commands received via the base station circuitry and the client circuitry.

19. The welding-type power supply of claim 1, wherein the base station circuitry is configured as a Bluetooth master node.

20. A welding-type power supply comprising:
power conversion circuitry configured to convert an input power into an output power for a welding-type operation;
access point circuitry configured to:
host a first wireless communication network;
broadcast a service set identifier (SSID);
client circuitry configured to connect to a second wireless communication network; and
control circuitry configured to:
provide a connection to a remote device configured to connect to the first wireless communication network using the SSID;
in response to the client circuitry not being connected to the second wireless communication network and not being configured for connection to the second wireless communication network, direct the client circuitry of the welding-type power supply to connect to the second wireless communication network based on a first command received via the base station circuitry from the first wireless communication network;
in response to a second command, download additional functionality to the welding-type power supply from the second wireless communication network; and
operate the welding-type power supply utilizing the additional functionality.

21. The welding-type power supply of claim 1, wherein after the base station circuitry receives the network configuration information of the second wireless communication network via the first wireless communication network, the welding-type power supply communicates with the second wireless communication via the client circuitry.

* * * * *